United States Patent [19]

Shimodaira et al.

[11] Patent Number: 4,862,048
[45] Date of Patent: Aug. 29, 1989

[54] SPEED CONTROL SYSTEM

[75] Inventors: Yoshikazu Shimodaira, Tokorozawa; Teruo Nozawa, Hanno, both of Japan

[73] Assignee: Tsubakimoto Chain Co., Japan

[21] Appl. No.: 309,501

[22] Filed: Feb. 10, 1989

[30] Foreign Application Priority Data

Feb. 10, 1988 [JP] Japan ............................. 63-15655[U]

[51] Int. Cl.[4] ............................................. G05B 11/00
[52] U.S. Cl. .................................. 318/640; 318/687; 318/135; 388/814; 388/910; 388/912; 388/933
[58] Field of Search ....................... 318/640, 687, 135; 388/802, 810, 814, 910, 912, 933

[56] References Cited

U.S. PATENT DOCUMENTS

| | | | |
|---|---|---|---|
| 3,096,444 | 7/1963 | Seward | 388/814 |
| 3,268,788 | 8/1966 | Branco | 388/814 X |
| 3,462,663 | 8/1969 | Schiller | 388/814 |
| 3,919,634 | 11/1975 | Appel et al. | 388/814 X |
| 4,008,424 | 2/1977 | Bompani | 388/814 X |
| 4,323,832 | 4/1982 | Okamura | 388/810 |
| 4,551,715 | 11/1985 | Durbin | 388/810 X |
| 4,667,139 | 5/1987 | Hirai et al. | 318/687 |

Primary Examiner—Benjamin Dobeck
Attorney, Agent, or Firm—Howson & Howson

[57] ABSTRACT

In a speed control system for a carriage movable along a predetermined path, light beams originating at the ends of the path are deflected by light conductors aboard the carriage so that they are interrupted, as the carriage moves, by a slotted plate extending along the path. The light beams are then deflected by light conductors so that they are directed along the carriage path to light receivers situated at the ends of the path. Electrical pulses from the light receivers are ORed together and converted by a transducer to a signal representative of the actual carriage speed, and by a counter to a signal representative of the carriage position. The carriage position signal is converted, in accordance with a predetermined functional relationship, to a speed set signal which is compared with the actual carriage speed. A signal, representative of the difference between the actual speed and the set speed is used to control the driving motor for the carriage. The speed and position determination achieved by the control system makes it possible to stop the carriage at a predetermined fixed position regardless of the speed of the carriage by initiating braking at different carriage positions, depending on carriage speed.

4 Claims, 2 Drawing Sheets

SPEED CONTROL SYSTEM

BRIEF SUMMARY OF THE INVENTION

This invention relates to control systems of the kind adapted to control the running speed and position of a carriage or similar device adapted to move along a predetermined running path, for example a carriage of the type used to transport workpieces in a manufacturing or processing plant.

A known speed control system for a linear motor-driven carriage or similar running body, described in Japanese laid-open utility model application 54021/1988, comprises a slotted plate affixed to the carriage. The plate has a plurality of slots arranged at predetermined intervals along the direction of movement of the carriage. A plurality of light sources and photosensors are disposed along the path of the carriage and opposed to each other so that the slotted plate on the carriage moves in a path between the light sources and their opposed photosensors to interrupt the light paths. The outputs of the photosensors are connected in a circuit so that they are logically ORed together to provide a single output signal.

One drawback of the known speed control system is that speed detection is possible only within a limited range of carriage positions in which speed detecting means are provided. Thus, a large number of light sources and photosensors is required, especially in the case of a long running path. Moreover, providing a satisfactory OR circuit is difficult because of problems in phase matching.

In the known speed control system, braking is effected when the carriage passes a fixed predetermined position. Thus, the ultimate stopping position of the carriage varies, depending on carriage speed.

The present invention comprises a slotted plate arranged along the path of the carriage rather than carried by the carriage. The slots of the plate are disposed at predetermined intervals in the direction of travel of the carriage. Light emitting and light receiving devices are arranged to provide a light path at least part of which moves with the carriage. The moving part of the light path is disposed so that it alternately passes through the slots in the plate and is interrupted by the portions of the plate between the slots as the carriage moves along its path of movement. A transducer is provided to convert pulses from the light-receiving devices to a signal representing the speed of the carriage. A counter is also provided for counting the pulses from the light-receiving devices in order to determine the position of the carriage. Speed setting means is provided to generate a set speed signal in response to the count of the counter. Thus, the set speed signal is dependent on the carriage position. A comparator compares the speed signal from the transducer with the set speed signal to generate a speed control signal for the carriage.

As the carriage moves along its predetermined path, the light in the portion of the light path which moves with the carriage passes through the slots in the slotted plate and is received by the light-receiving means as light pulse signals. Corresponding electrical pulses are transmitted to the transducer and the counter.

The transducer transforms the pulse signals to speed signals and sends the speed signals to the comparator. The counter counts the pulse signals and transmits the count to the speed setting means. The speed setting means determines the position of the carriage on the basis of the count, and produces a set speed signals which has a predetermined value which is a function of the carriage position. The speed setting means transmits the set speed signal to the comparator.

The comparator compares the set speed signal with the speed signal. The output of the comparator is used to control the speed of the carriage, e.g. by controlling the linear motor driving the carriage, so that the carriage speed is reduced if the actual speed exceeds the set speed, and the speed of the carriage is increased if the actual speed is less than the set speed.

The principal objects of this invention are to provide a speed control which overcomes the aforementioned deficiencies of the prior art, and also to provide a speed control system in which the stopping position of the carriage is less dependent on the carriage operating speed. It is also an object of the invention to provide a simple and effective means for coupling pulse signals from a moving carriage to stationary components of the speed control system. Still a further object of the invention is to provide a simple and inexpensive speed control system for work carriages.

DETAILED DESCRIPTION

Figure 1:
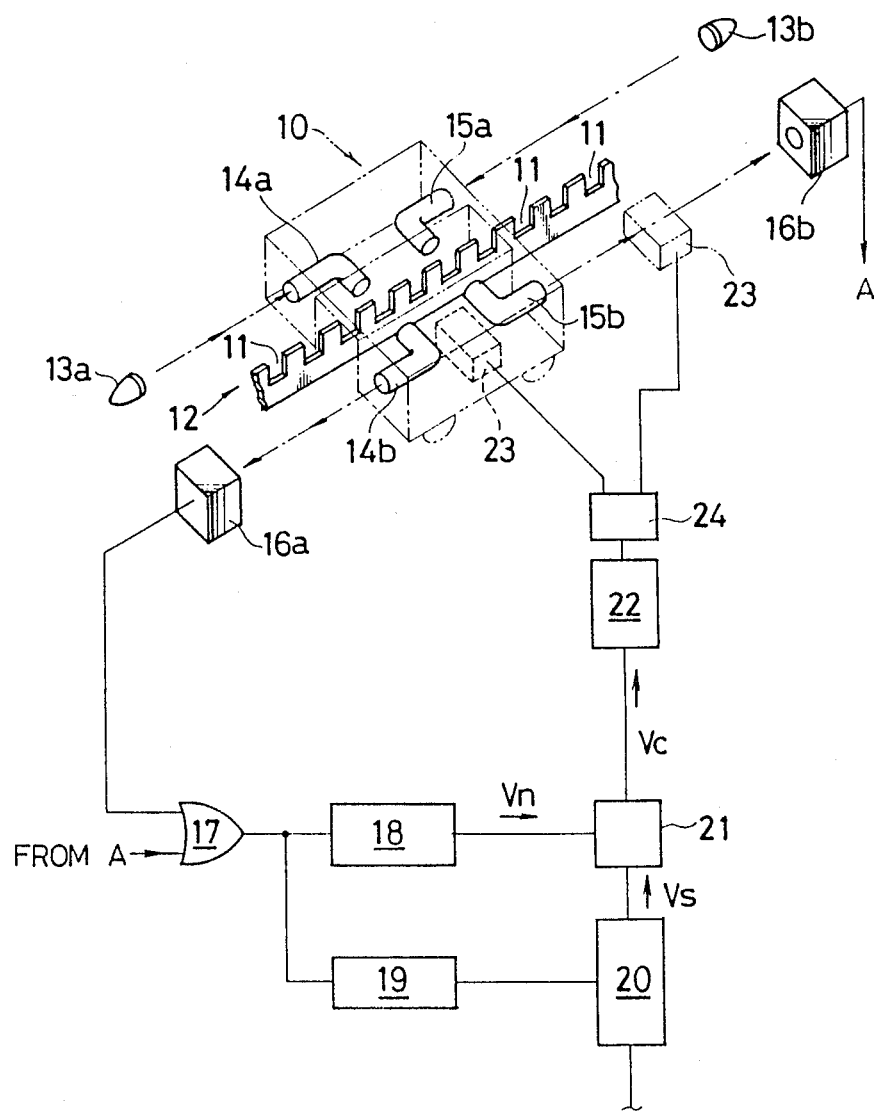
FIG. 1 is a schematic diagram of the speed control system according to the invention.

FIG. 1 shows a carriage 10 adapted to move along a straight running path. A plate 12 extends along the path of the carriage, preferably along substantially its entire length, and has a plurality of slots 11 disposed along its length for allowing a light beam to pass from one side of the plate to the other. These slots are preferably arranged at a predetermined uniform pitch, although in some cases it may be advantageous to vary the pitch of the array of slots along the length of plate 12.

Light sources 13a and 13b, for example lasers, are disposed at both ends of the running path, and each produces a beam directed parallel to the running path.

Two pairs of optical conductors are provided on carriage 10, one pair comprising conductors 14a and 14b, and the other pair comprising conductors 15a and 15b. These optical conductors may take the form of optical fibers or optical fiber bundles, and are bent in order to deflect the light beams from the light sources through the slots in plate 12 and back to the ends of the running path. Mirrors may be used as alternative means for light beam deflection.

Ends of light conductors 14a and 15a face light sources 13a and 13b respectively. Similarly, ends of light conductors 14b and 15b face light receiving devices 16a and 16b provided at opposite ends of the running path. The other ends of the light conductors of each pair 14a–14b and 15a–15b face each other with the slotted plate 12 therebetween. Thus, two light paths are provided. One light path extends from source 13a to light receiver 16a, through light conductors 14a and 14b. Similarly, the other light path extends from source 13b to light receiver 16b through light conductors 15a and 15b. The portion of each light path extending across the slotted plate moves with the carriage.

The light receiving devices, which may comprise photodiodes, phototransistors or other light-sensing devices having a rapid response, produce an "on-off" modulated electrical signal in response to light passing through the slots 11 in plate 12. In other words, they receive light pulses and convert them to electrical pulses.

OR gate 17 receives inputs from both light-receiving devices 16a and 16b. The provision of two pairs of optical fibers, and light sources and light-receiving devices at both ends of running path insures that while one set of light conductors moves away from its corresponding light source and light receiver, the other set moves closer to its corresponding light source and light receiver. This insures that a light pulse of adequate strength is received at least at one end of the running path regardless of the position of the carriage.

The output of OR gate 17 is an electrical pulse signal, which is converted by a transducer 18 to a signal $V_n$ representative of the current speed of the carriage.

Counter 19 is connected to count the electrical pulses appearing at the output of OR gate 17. The count in counter 19 is representative of the current position of the carriage. A signal from the driving circuit for the linear carriage driving motor causes the counter to count up or down depending on the direction of movement of the carriage.

Speed setting means 20 produces a speed-setting signal $V_s$ as a function of the count in counter 19. A predetermined functional relationship is prestored in speed setting means 20. The speed setting signal $V_s$ is an output which corresponds to the predetermined desired carriage speed for any given carriage position.

Comparator 21 compares the current speed signal $V_n$ from transducer 18 with the set speed signal $V_s$ from speed setting means 20. The output of the comparator is a difference signal $V_c = V_n - V_s$. $V_c$ serves as a control signal for accelerating or decelerating the carriage. If $V_c$ is positive, the carriage is decelerated, and if the $V_c$ is negative, the carriage is accelerated.

Amplifier 22 amplifies the control signal $V_c$ and delivers the amplified signal to a control unit 24. The linear induction motor which operates the carriage has a plurality of primary member 23 disposed along the running path of the carriage. These primary members are controlled by the control unit 24 to cause the carriage to run or stop according to the amplified control signal. The secondary member (not shown) of the linear motor is carried by the carriage 10.

It will be apparent from the foregoing that the system described is a control system having a feedback loop. Its operation is as follows.

As the carriage begins to run, light rays emitted from light sources 13a, 13b are transformed into light pulse signals as a result of the interruption of the light beams by the slotted plate 12. The pulse intervals vary according to the speed of the carriage:

The light pulse signals received by the light receivers 16a, 16b are transformed into electrical pulses. These electrical pulses are, in turn, transmitted to the counter 19 and transducer 18 through OR gate 17. The pulses are counted by counter 19. Transducer 18 produces a speed signal $V_n$ corresponding to the current speed of the carriage.

The speed setting means 20 sends a set speed signal $V_s$ to the comparator 21. This set speed signal depends upon the count in counter 19, and is thus dependent on the carriage position.

Comparator 21 receives the speed signal $V_n$ and the set speed signal $V_s$, and causes speed control signals to be transmitted to the primary members 23 of the linear motor by control unit 24. The feedback loop causes the difference signal $V_c$ to approach zero. Therefore, the speed of the carriage at any position along its running path always approaches the set speed as predetermined by speed setting means 20.

While the carriage is stationary, it is locked by a brake (not shown).

Although two separate pairs of light conductors are shown at positions spaced in the direction of carriage movement, an alternate arrangement is possible in which one pair is located directly above the other pair. Where two pairs of light conductors are used, the pairs should be arranged one above the other, or spaced along the direction of carriage movement by an amount equal to the slot pitch or an integral multiple thereof.

While two pairs of light conductors are desirable to insure adequate light pulse strength for all carriage positions, in some cases, for example short carriage runs, a single pair of light conductors, a single light source, and a single light receiver may be adequate. In this case, OR gate 17 can be eliminated. In the case of a single light source and light receiver, the entire system can be very simple and compact.

It is possible to provide two or more carriages on the same running path, in which case all may utilize the same slotted plate for speed control. Each carriage will have its own speed control system, and the light sources, light receivers and light conductors must be arranged so that no carriage interferes with the light beam used to control the speed of another carriage.

Fiberoptic light conductors, mirrors and the like can be eliminated if a light source and light receiver are provided on the carriage itself. Speed and position signals can be transmitted to the speed setting means and comparator by telemetry. Such an arrangement may be used, for example, when the carriage is required to travel along a curved running path.

Figure 2:
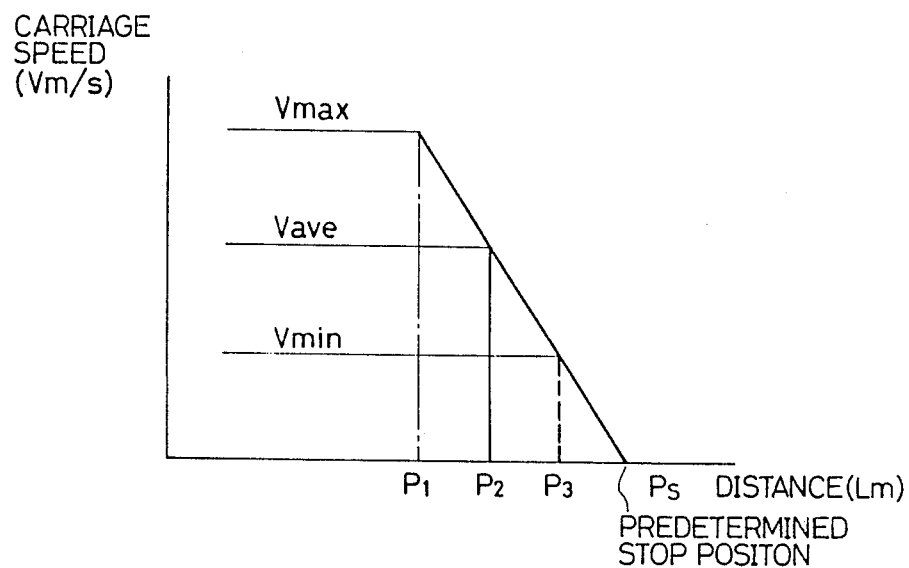
FIG. 2 is a plot showing the relationship of carriage speed and carriage stop position in a carriage transporting system utilizing the present invention.

In the apparatus described, the current speed and position of the carriage are detected utilizing light beams so that the carriage may run along its path at a predetermined speed. As shown in FIG. 2, which illustrates the relationship between stop position and speed, if it is desired to stop the carriage 10 at a predetermined position $P_s$, deceleration-initiating positions $P_1$, $P_2$ and $P_3$ are set automatically according to the maximum, average and minimum speeds of the carriage $V_{max}$, $V_{ave}$ and $V_{min}$. The deceleration of the carriage begins at different positions depending on its speed, and it comes smoothly and accurately to a stop substantially at the desired stop position $P_s$ regardless of its speed prior to deceleration.

In other words, since the counted number of pulses indicates the current position of the carriage 10, the residual distance to the desired stop position can be computed. The current speed of the carriage is also known from the pulse repetition rate Thus, it is possible to determine the optimum position to initiate deceleration and to instruct the driving motor accordingly.

Figure 3:
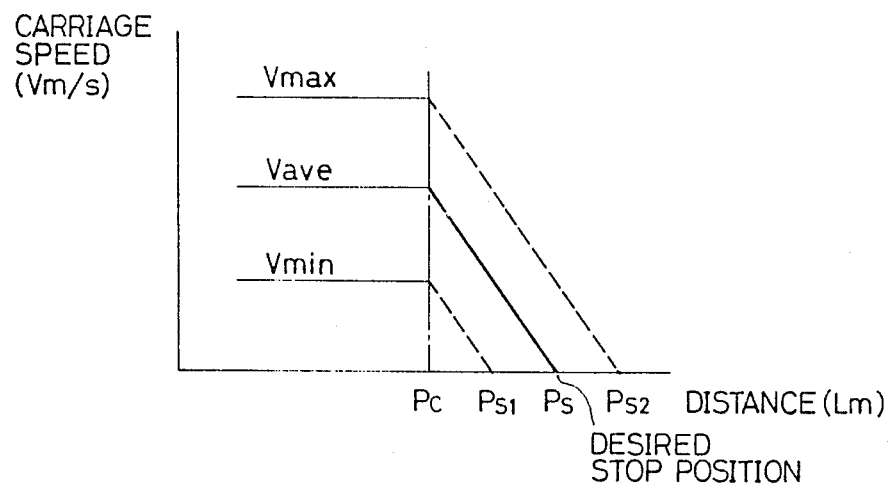
FIG. 3 is a similar plot showing the relationship of carriage speed and carriage stop position in a carriage transporting system of the prior art.

In contrast, in prior systems, as illustrated in FIG. 3, braking of the carriage is initiated as the carriage passes a predetermined fixed position $P_c$. While the carriage will stop at a desired stop position $P_s$ if it is moving at average speed $V_{ave}$ prior to initiation of braking, the stop position is speed-dependent, Thus, if the carriage is moving at its maximum speed $V_{max}$, it will stop at position $P_{s2}$. If the carriage is moving at its minimum speed $V_{min}$, it will stop at position $P_{s1}$.

Since the control system is a feedback control system, a set speed can be maintained regardless of varying conditions along the running path. It is also possible to effect adjustment on the spot.

Since speed control can be effected by means of an electric brake rather than by a mechanical brake, smooth deceleration and stopping may be effected irrespective of conditions such as the weight of the carriage and its load.

The speed, speed setting and speed control signals can be either digital or analog, and various means, such as microprocessors, programmed logic arrays, or non-linear networks, can be used in speed setting means 20 to set the predetermined relationship between carriage position and the speed set signal $V_s$. In a possible modification of the apparatus described, the light source or sources can be carried aboard the carriage while the light receiving means are located at stationary positions at one or both ends of the running path. As mentioned previously, with telemetry, both the light source and the light receiver can be aboard the carriage. Numerous other modifications can be made to the apparatus described without departing from the scope of the invention as defined in the following claims.

We claim:

1. In a system comprising a running body movable along a predetermined path, a speed control system comprising:
    a slotted plate provided along the path of said running body, said plate having a plurality of slots disposed at predetermined intervals along the path of the running body;
    a light source;
    light receiving means for producing electrical pulses corresponding to received light pulses:
    means establishing a light path between said light source and said light receiving means, at least part of said light path being arranged to move with said running body and to be alternately passed through said slots and interrupted by portions of the plate between the slots as the running body moves along said running path;
    transducer means, arranged to receive said electrical pulses from said light receiving means, and responsive to said pulses for producing a speed signal representative of the current speed of said running body;
    counter means, arranged to receive and count electrical pulses from said light receiving means, for providing a position signal representative of the position of said running body;
    speed setting means, responsive to the position signal from said counter means, for generating a speed set signal which is a predetermined function of the position of the running body; and
    comparator means, responsive to the speed signal and to the speed set signal, for generating a speed control signal for the running body.

2. A speed control system according to claim 1 in which the light receiving means is stationary, and the means establishing a light path comprises light conducting means for directing light passed through the slots in said plate toward said light receiving means in a direction parallel to the path of the running body.

3. In a system comprising a running body movable along a predetermined path, a speed control system comprising:
    a slotted plate provided along the path of said running body, said plate having a plurality of slots disposed at predetermined intervals along the path of the running body;
    light source means;
    a pair of light receiving means for producing electrical pulses corresponding to received light pulses, said light receiving means being located at opposite ends of the path of said running body;
    means establishing light paths between said light source means and said light receiving means, at least part of each light path being arranged to move with said running body and to be alternately passed through said slots and interrupted by portions of the plate between the slots as the running body moves along said running path;
    OR gate means having inputs connected to receive electrical pulses from both of said light receiving means and having an output for producing electrical pulses when pulses appear at either or both of said inputs;
    transducer means, arranged to receive electrical pulses from the output of said OR gate, and responsive to said electrical pulses from the output of the OR gate for producing a speed signal representative of the current speed of said running body;
    counter means, arranged to receive and count electrical pulses from said light receiving means, for providing a position signal representative of the position of said running body;
    speed setting means, responsive to the position signal from said counter means, for generating a speed set signal which is a predetermined function of the position of the running body; and
    comparator means, responsive to the speed signal and to the speed set signal, for generating a speed control signal for the running body.

4. A speed control system according to claim 3 in which said light source means comprises a pair of light sources located at opposite ends of the path of the running body.

* * * * *